United States Patent
O'Neill

[19]

[11] Patent Number: 5,802,715
[45] Date of Patent: Sep. 8, 1998

[54] METHOD OF SEALING AN ELONGATE CABLE SPLICE

[75] Inventor: Andrew J. O'Neill, Cordova, Tenn.

[73] Assignee: Thomas & Betts Corporation, Memphis, Tenn.

[21] Appl. No.: 436,919

[22] Filed: May 8, 1995

Related U.S. Application Data

[63] Continuation-in-part of Ser. No. 373,357, Jan. 17, 1995, Pat. No. 5,613,298.

[51] Int. Cl.$^6$ .................................................. H01R 43/00
[52] U.S. Cl. ................................ 29/869; 29/871; 156/49; 156/54; 156/56
[58] Field of Search ............................ 29/869, 870, 871; 156/49, 54, 56

[56] References Cited

U.S. PATENT DOCUMENTS

| | | |
|---|---|---|
| 2,967,795 | 1/1961 | Bollmeier et al. . |
| 3,138,657 | 6/1964 | Wengen . |
| 3,499,972 | 3/1970 | Smith . |
| 3,619,481 | 11/1971 | Smith . |
| 3,823,250 | 7/1974 | De Monsy et al. . |
| 3,879,574 | 4/1975 | Filreis et al. . |
| 3,992,569 | 11/1976 | Hankins et al. . |
| 4,025,717 | 5/1977 | Whittingham . |
| 4,142,592 | 3/1979 | Brusselmans . |
| 4,164,621 | 8/1979 | Silva . |
| 4,257,630 | 3/1981 | Bartell et al. . |
| 4,282,397 | 8/1981 | Siedenburg et al. . |
| 4,436,566 | 3/1984 | Tight, Jr. . |
| 4,472,222 | 9/1984 | Moisson et al. . |
| 4,484,962 | 11/1984 | Dienes et al. . |
| 4,511,611 | 4/1985 | Moisson . |
| 4,545,830 | 10/1985 | Dienes et al. . |
| 4,581,265 | 4/1986 | Foillette . |
| 4,639,546 | 1/1987 | Meltsch . |
| 4,647,719 | 3/1987 | Campbell et al. . |
| 4,648,919 | 3/1987 | Draz et al. . |
| 4,685,981 | 8/1987 | Dienes . |
| 4,731,271 | 3/1988 | Heuche et al. . |
| 4,732,628 | 3/1988 | Dienes . |
| 4,740,653 | 4/1988 | Hellbusch . |
| 4,742,181 | 5/1988 | Dienes . |
| 4,875,952 | 10/1989 | Mullin et al. . |
| 4,933,512 | 6/1990 | Nimiya et al. . |
| 5,185,844 | 2/1993 | Bensel et al. . |
| 5,245,133 | 9/1993 | DeCarlo et al. . |
| 5,251,373 | 10/1993 | DeCarlo et al. . |
| 5,254,809 | 10/1993 | Martin . |
| 5,258,578 | 11/1993 | Smith et al. . |
| 5,331,114 | 7/1994 | Rudolph . |
| 5,613,298 | 3/1997 | O'Neill et al. . |

FOREIGN PATENT DOCUMENTS

| | | |
|---|---|---|
| 384176A3 | 8/1990 | European Pat. Off. . |
| 538009A3 | 4/1993 | European Pat. Off. . |

*Primary Examiner*—Carl J. Arbes
*Attorney, Agent, or Firm*—Michael L. Hoelter; Salvatore J. Abbruzzese

[57] ABSTRACT

A method and apparatus provides for the sealing of an elongate splice of an electrical cable. A central extent of the splice is enclosed in a cylindrical enclosure tube so as to define exposed lateral splice extents on each side thereof. Sealing dams are constructed about the cable adjacent each end of the cable splice and adjacent each end of the tube. The exposed lateral splice extents are covered with a pair of elongate generally cylindrical splice enclosing shells each having open ends. The open ends of the shells are sealably attached to the sealing dams to sealably enclose the cable splice. The shells and the tube are filled with a curable encapsulant to fully encapsulate the cable splice.

11 Claims, 13 Drawing Sheets

METHOD OF SEALING AN ELONGATE CABLE SPLICE

CROSS REFERENCE TO RELATED APPLICATIONS:

The present application is a continuation-in-part of U.S. Patent application Ser. No. 08/373,357 filed on Jan. 17, 1995 and entitled "Forced Encapsulation Cable Splice Enclosure" now U.S. Pat. No. 5,613,298.

BACKGROUND OF THE INVENTION:

The present invention relates generally to a method and apparatus for sealably enclosing an extended length of a cable splice. More particularly, the present invention relates to a method and apparatus for providing an enclosure for an elongate cable splice which accommodates forced encapsulant therein for sealing the cable splice.

FIELD OF THE INVENTION:

Electrical cables, especially telecommunications cables are typically run outdoors, either suspended overhead or buried underground. In order to effect repairs to the individual conductors within the cable, or to make interconnections thereto, the integrity of the cable must be violated. Once repairs or interconnections are accomplished, the exposed area of the cable, commonly referred to as a cable splice, must be resealed in order to protect the conductors against the outdoor environment.

Many techniques are currently known for sealably covering cable splices. One particularly effective technique is to use a cable splice closure, which includes an enclosure filled with an encapsulant which fully surrounds the splice to seal the splice against moisture penetration which is prevalent in outdoor environments. These encapsulants are typically provided in a semi-fluid state and poured into the enclosure over the cable splice. The encapsulant may be forced into the enclosure under pressure so that the encapsulant fully surrounds the cable splice and fills the interstices between conductors. The encapsulant then cures to a gel-like consistency to effectively seal the splice.

In order to retain the encapsulant under pressure prior to curing, the ends of the enclosure must be sealed. End seals generally fall into two categories. The first type of end seals which may be used in combination with splice enclosures are rigid end seals. These end seals are clamped in sealed fashion to spaced apart locations on the cable on either side of the splice. The splice enclosure is then sealably secured to the end seals at each end thereof. Rigid end seals of this type provide an effective technique for sealably closing the opposed ends of a splice enclosure so as to resist moisture intrusion, as well as retain encapsulant which is forced into the enclosure. An example of rigid end seals used in combination with a cable splice enclosure is shown in U.S. Pat. Nos. 5,245,133 and 5,251,373. While extremely effective, these rigid end seals are multi-component devices requiring skilled installation.

A second approach is to employ sealing collars or dams about the cable on either side of the splice. Each sealing dam may be formed, for example, by wrapping mastic tape around the cable to form a buildup of mastic about which the ends of the enclosure may be positioned. The mastic provides for good sealing contact with cable as well as with the enclosure. The mastic tape, while sufficiently viscous to permit wrapping and positioning about the cable, does exhibit some degree of flow. While this permits good compressive engagement to be made, it does make securement of the cover around the dams more difficult. The enclosure is typically secured by applying a compression strap over the enclosure about the sealing dams as well as at other locations. However, compression of the straps may tend to cause movement of the mastic. Also, upon forcing encapsulant into the enclosure, the mastic sealing dams have a tendency to migrate out from the enclosure due to the internal pressure applied by the encapsulant. In order to prevent this tendency, the craftsperson must secure the sealing dams to the ends of the enclosure. This is typically accomplished by wrapping the ends of the enclosure and the cable adjacent the sealing dams with a sealing tape. As can be seen, this requires additional steps as well additional materials which must be carried by the installer. Further, the integrity of such a tape-wrapped assembly is extremely craft-sensitive and is difficult to construct for longer cable splice extents.

It is therefore desirable to provide a splice enclosure which can be easily applied, and which can be used to enclose an extended length of a cable splice.

SUMMARY OF THE INVENTION:

It is an object of the present invention to provide a method and apparatus for sealably enclosing an elongate cable splice.

It is a further object of the present invention to provide a cable splice closure including plural enclosure shells and end seals which support the shells about the splice and accommodate a curable encapsulant.

It is a still further object of the present invention to provide a cable splice enclosure which allows for the enclosing of an elongate cable splice employing a pair of spaced apart enclosure shells.

It is yet a further object of the present invention to provide an improved method for sealably enclosing an elongate extent of an electrical cable splice.

In the efficient attainment of these and other objects, the present invention provides an improved method and apparatus for sealing an elongate splice of an electrical cable. A central extent of the splice is enclosed with a generally cylindrical enclosure tube so as to define exposed lateral splice extents on each side of the tube. Sealing dams are constructed about the cable on each side of the elongate splice and about each end of the tube. An elongate cylindrical splice enclosing shell is positioned over each lateral splice extent. The splice enclosure shell includes opposed open ends. The open ends of each of the shells are sealably attached to the sealing dams to sealably enclose the splice.

As more particularly described by way of the preferred embodiment herein, the splice enclosing shells may be filled with a curable encapsulant to sealably encapsulate the splice. The shells may also include plural elongate fingers extending from each of the ends thereof. The fingers of the shell ends may be secured outwardly adjacent each of the sealing dams. Compressive fastening members such as cable ties may be applied about the fingers to secure the fingers adjacent the sealing dams. The ends of the shells which overlie the cylindrical enclosure tube may be interleaved so as to be secured by a single cable tie.

Figure 1:
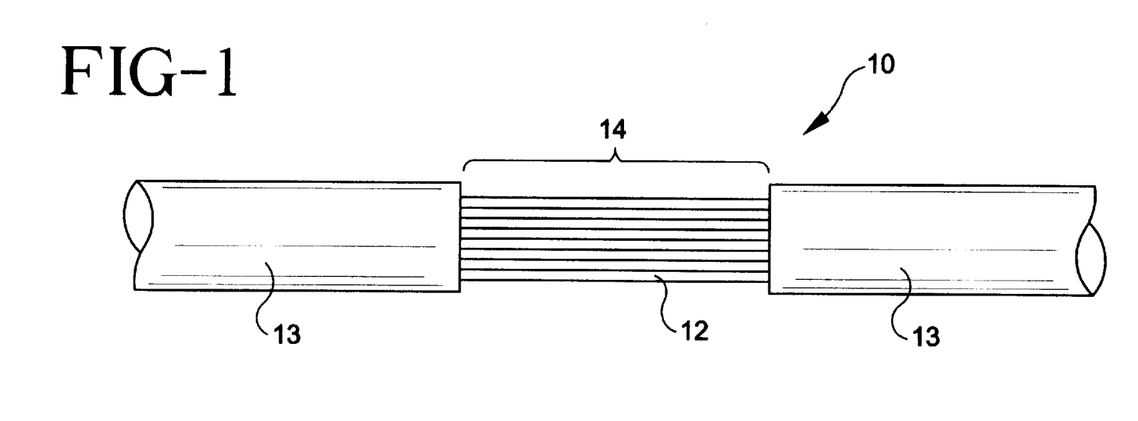
FIG. 1 is a side elevational view of a portion of an electrical cable having an exposed central area referred to as a cable splice.

DETAILED DESCRIPTION OF THE PREFERRED EMBODIMENTS:

Referring to FIG. 1, an extent of telecommunications cable 10 is shown. Cable 10 includes a plurality of individually insulated electrical conductors 12 extending through an outer insulative cable jacket 13. Conductors 12, which are of conventional construction, each being formed of copper and having plastic insulation thereover, are shown schematically. A portion of cable jacket 13 is typically broken away to create an exposed area 14, which permits access to conductors 12 for repairs, maintenance, or to splice additional conductors thereto in a manner which is well-known in the art. The exposed area 14 is created by cutting away a portion of jacket 13. The exposed area 14 and the repairs or splices made thereat is typically referred to as a cable splice or cable splice location, and these terms may be used interchangeably to describe the exposed area 14 of cable 10. After effecting repairs or splices to the cable, the cable splice 14 must be covered for protective purposes. The description which follows sets forth the preferred method and apparatus of the present invention for sealably covering cable splice 14.

Figure 2:
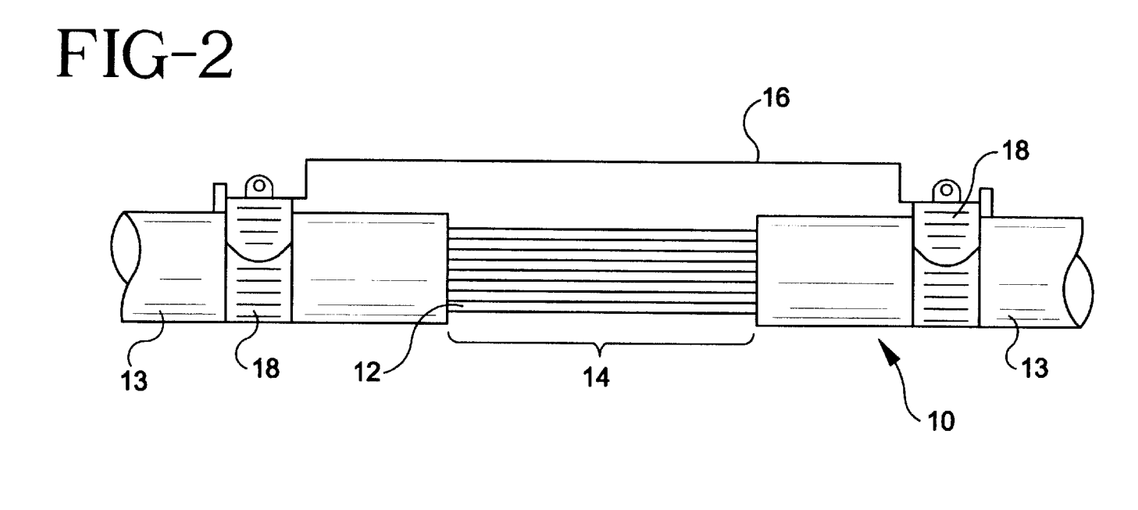
FIG. 2 is a side elevational showing of the electrical cable of FIG. 1 with a stabilizing bar being positioned across the cable splice.

Referring now to FIG. 2, the present invention employs a stabilizer bar 16, which is constructed of length sufficient to span splice 14. Stabilizer bar 16 is formed of a sufficiently rigid material such as metal, and is anchored to the cable jacket 13 on either side of splice 14. Compression clamps 18 or other compressive fastening members may be used to secure stabilizer bar 16 to jacket 13 of cable 10. Stabilizer bar 16 provides structural stability to splice 14, preventing sharp bending thereat which could adversely affect the connections or repairs made to splice 14. Also in certain situations, stabilizer bar 14 may also function as a ground strap assuring electrical ground continuity across splice 14. At a stage either prior to or after installation of stabilizer bar 16, repairs, maintenance or splices may be made to conductors 12 at splice 14. These repairs or splices may be accomplished in a manner well known in the art.

Figure 3:
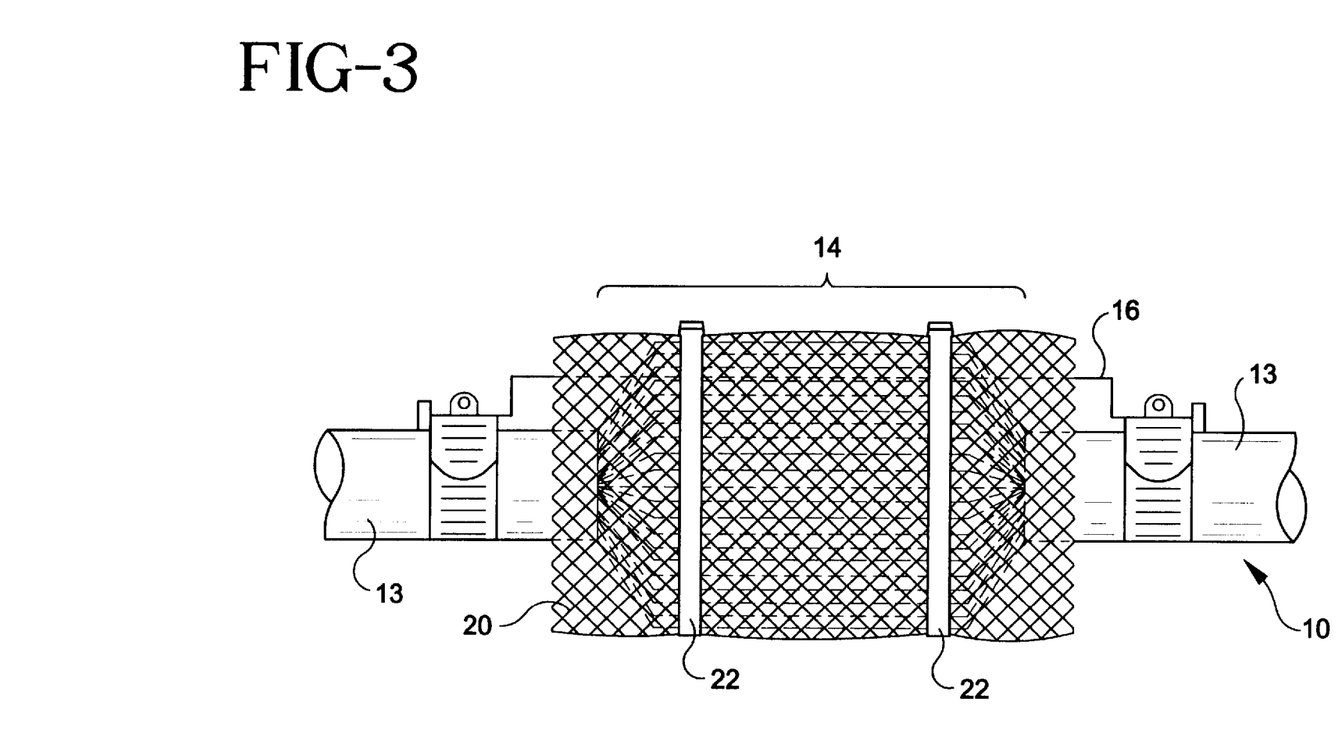
FIG. 3 shows the cable of FIG. 1 with a spacer web positioned about the cable splice.

Referring to FIG. 3, splice 14 is covered with a spacer web 20. Web 20 is generally a mesh-like member which is wrapped around splice 14 and secured thereto using cable ties 22 or other fastening members. As will be described in further detail hereinbelow, spacer web 20 permits the effective encapsulation of splice 14 with a curable encapsulant. Spacer web 20 is of the type which is shown and described in commonly assigned U.S. Pat. No. 4,685,891 issued on Aug. 11, 1987, entitled "Method and Apparatus for Providing a Spacer to a Cable Splice".

Figure 4:
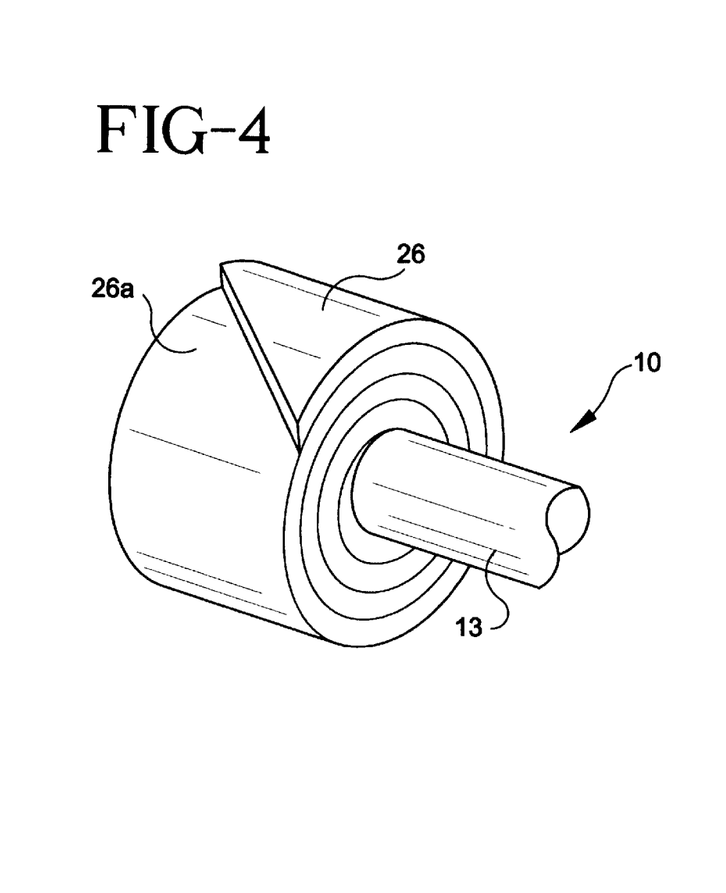
FIG. 4 shows a portion of the electrical cable of FIG. 1 adjacent one side of the splice, with a foam end seal being placed therearound.
Figure 5:
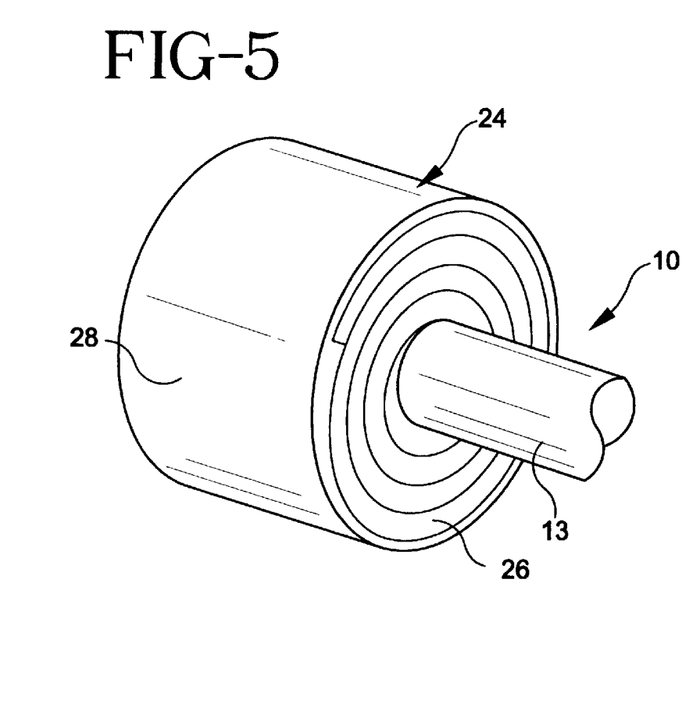
FIG. 5 shows the cable portion of FIG. 4 with a mastic tape placed about the foam end seal.

Referring now to FIGS. 4 and 5, construction of end seals or sealing dams 24 (FIG. 5) may be described. As sealing dams 24 are formed about cable jacket 13 on each side of splice 14 in an identical manner, only formation of one sealing dam 24 will be described with reference to FIGS. 4 and 5. Sealing dam 24 is initially constructed by employing a closed cell foam 26 which may be provided in roll form. Foam 26 is generally a compressible, closed cellular structure. Foam 26 may include adhesive backing on one or both longitudinal planar surfaces 26a, so as to permit the foam to be adhesively wrapped about cable jacket 13. The adhesive surfaces 26a, which may be exposed by removal of release liners (not shown), permit the foam 26 to be adhesively secured to the cable as well as to itself when wrapped therearound. In preferred construction, the foam is wrapped about the cable jacket 13 until the built up diameter of the wraps of foam is larger than the diameter of the splice 14.

Referring to FIG. 5, after the foam 26 is properly positioned about cable jacket 13, a wrapping of mastic tape 28 may be placed thereover. Mastic tape 28 is formed of a tacky, generally compressible mastic which may be supplied in a tape-like rolled form. The mastic tape 28 is wrapped about the foam 26 to further increase the circumference of the sealing dam 24. As shown in FIG. 5, a combination of a foam wrap and a mastic wrap forms sealing dam 24. While this combination is shown as the preferred construction, it is contemplated that other constructions may also be formed. Constructions such as successive alternating wraps of tape and foam may be employed. The present invention further contemplates the use of foam 26 or mastic tape 28 alone to form sealing dam 24. However, as will be described in further detail hereinbelow, it has been found that the combination of a first layer of foam 26 with a wrapping of mastic tape 28 thereover provides superior end sealing, as well as structural integrity.

Figure 6:
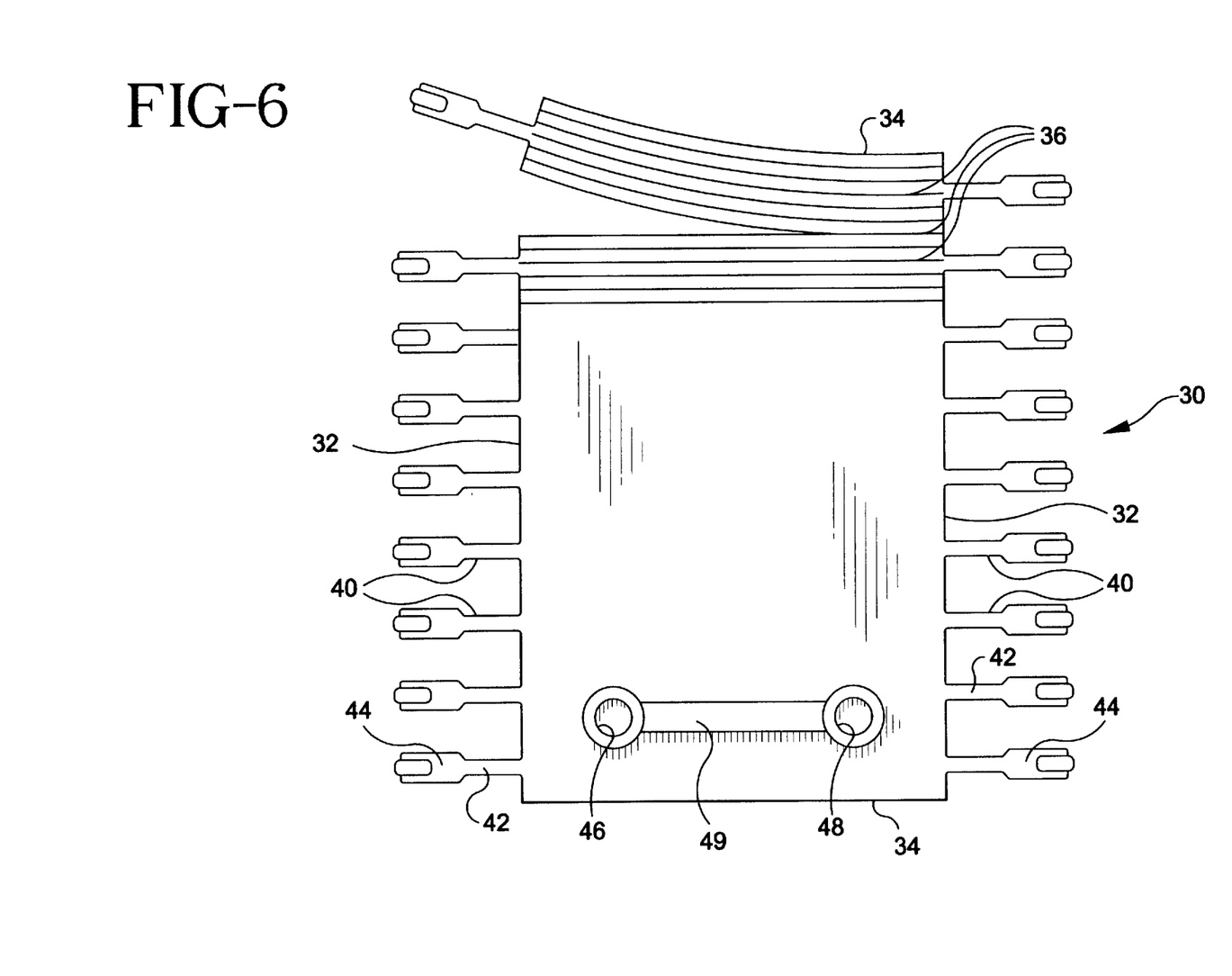
FIG. 6 shows the splice enclosure shell of the present invention used to cover the cable splice shown in FIG. 5.

Referring now to FIG. 6, cable enclosure shell 30 of the present invention is shown. Shell 30 is an elongate flexible planar sheet of plastic material. Shell 30 is generally rectangular, having opposed longitudinal edges 32 and opposed transverse edges 34. The distance between longitudinal edges 32 is constructed so that shell 30 spans cable splice 14 (FIG. 3). In use, shell 30 is wrapped in a cylindrical manner with opposed transverse edges 34 overlapping to form an elongate split unitary cylindrical structure (FIG. 7) having opposed open ends 32a defined by rolled longitudinal edges 32.

Other constructions of shell 30 are also within the contemplation of the present invention. Hard shells having upper and lower shell halves such as those shown in the above identified '133 and '373 patents may also be employed. However, the flexible shell 30 shown herein has particular utility as it permits use on cable splices 14 of various diameters.

As the diameter of splice 14 may vary depending upon the amount of repairs or interconnections conducted thereat, the length of the planar sheet forming shell 30 may be varied. Shell 30 includes a plurality of longitudinally spaced transversely extending score lines 36, along which shell 30 may be cut or torn to vary the length of the shell. An appropriate cutting tool (not shown) may be used to cut or tear the shell 30 along one of score lines 36.

For purposes which will be described in further detail hereinbelow, shell 30 includes a plurality of spaced fingers 40. Fingers 40 extend outwardly from longitudinal edges 32. In the preferred embodiment, fingers 40 are integrally formed with shell 30. Also as shown, each finger 40 includes a narrow proximal portion 42 immediately extending from longitudinal edge 32 and a wider distal portion 44, spaced from longitudinal edge 32.

Shell 30 further includes an inlet port 46 and a transversely spaced outlet port 48 therethrough. Ports 46 and 48 may be formed integrally with the formation of shell 30 or may be placed in shell 30 after formation thereof. In the present illustrative embodiment, an integrally formed structural reinforcing member 49 spans the space between ports 46 and 48. The use of ports 46 and 48 will be described in further detail hereinbelow.

Figure 7:
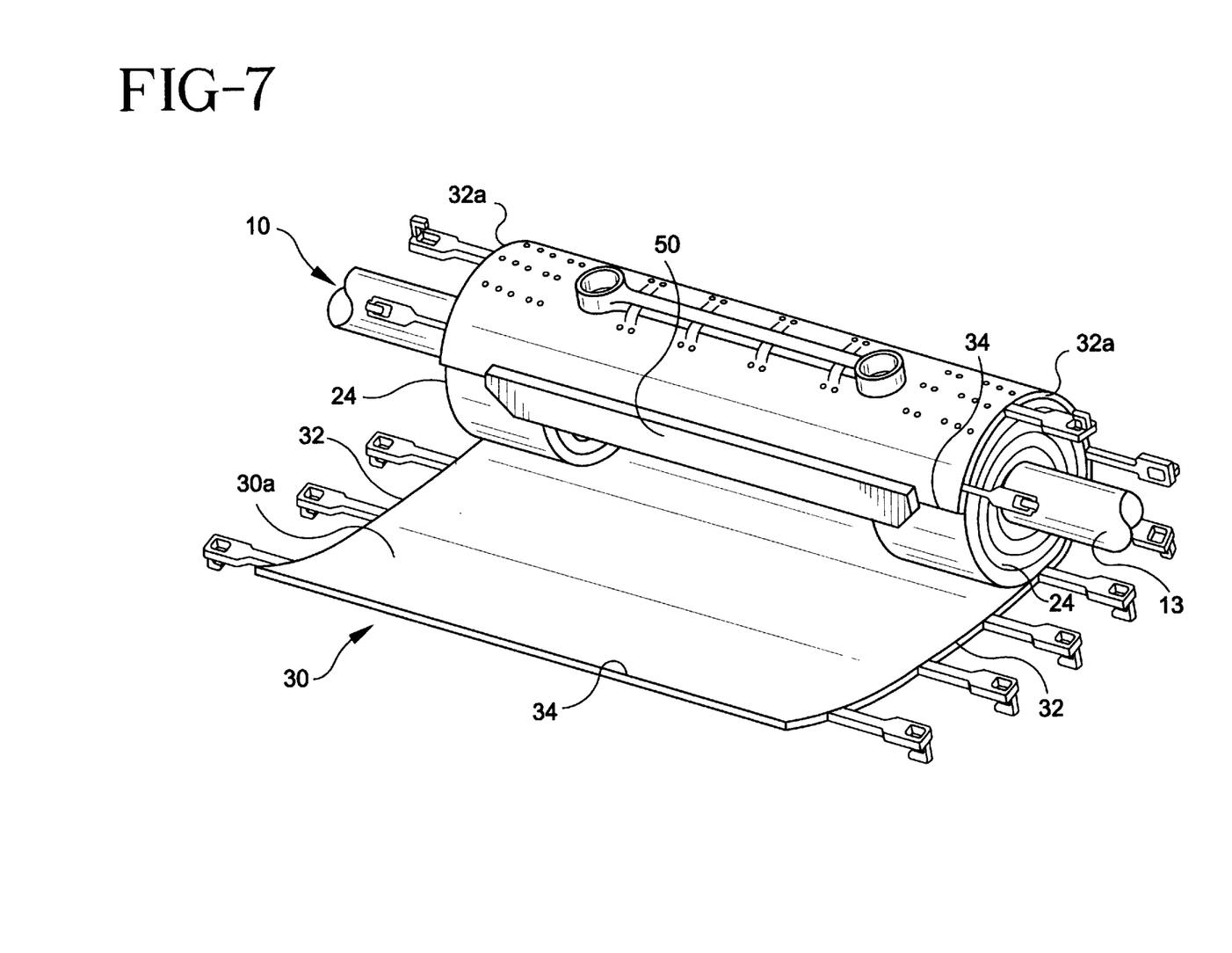
FIG. 7 shows the splice enclosure shell of FIG. 6 partially wrapped about the cable splice.

Referring more specifically to FIG. 7, shell 30 may be wrapped around cable splice 14. After shell 30 is cut to the desired length, the shell 30 is positioned about splice 14 with one planar surface 30a positioned in contact with sealing dams 24. The shell is positioned so that sealing dams 24 are adjacent longitudinal edges 32 of shell 30. In this manner, when shell 30 is formed into a cylindrical structure, sealing dams 24 close open ends 32a thereof. Shell 30 is positioned so that opposed transverse edges 34 overlap. A strip of gasketing material 50 may be interposed between the overlapped edges 34. Any suitable gasketing material may be employed. In fact, it is contemplated that either or both of strips of foam 26 or mastic tape 28 may be employed as a sealing gasket. When properly overlapped, shell 30 forms a unitary cylindrical enclosure 52 about splice 14 (FIG. 8) with sealing dams 24 closing opposed open ends 32a thereof.

In order to retain shell 30 in a closed cylindrical construction, a plurality of radially compressive retaining straps 54 may be positioned therearound. One or more of the straps 54a is positioned directly over each of sealing dams 24. In this manner, tight compressive engagement is maintained between shell 30 and sealing dam 24 adjacent open end 32a.

The present construction of sealing dams 24, as above described, formed with a combination of closed cell foam 26 and mastic tape 28, provides a superior seal at open ends 32a of shell 30. While tight compressive engagement must be maintained between shell 30 and sealing dams 24, overcompression caused by tightening of straps 54a thereat has a tendency to cause compressive flow or movement of dams 24. The above described combination of foam 26 and mastic tape 28 provides sufficient rigidity to sealing dams 24, reducing this tendency.

Figure 8:
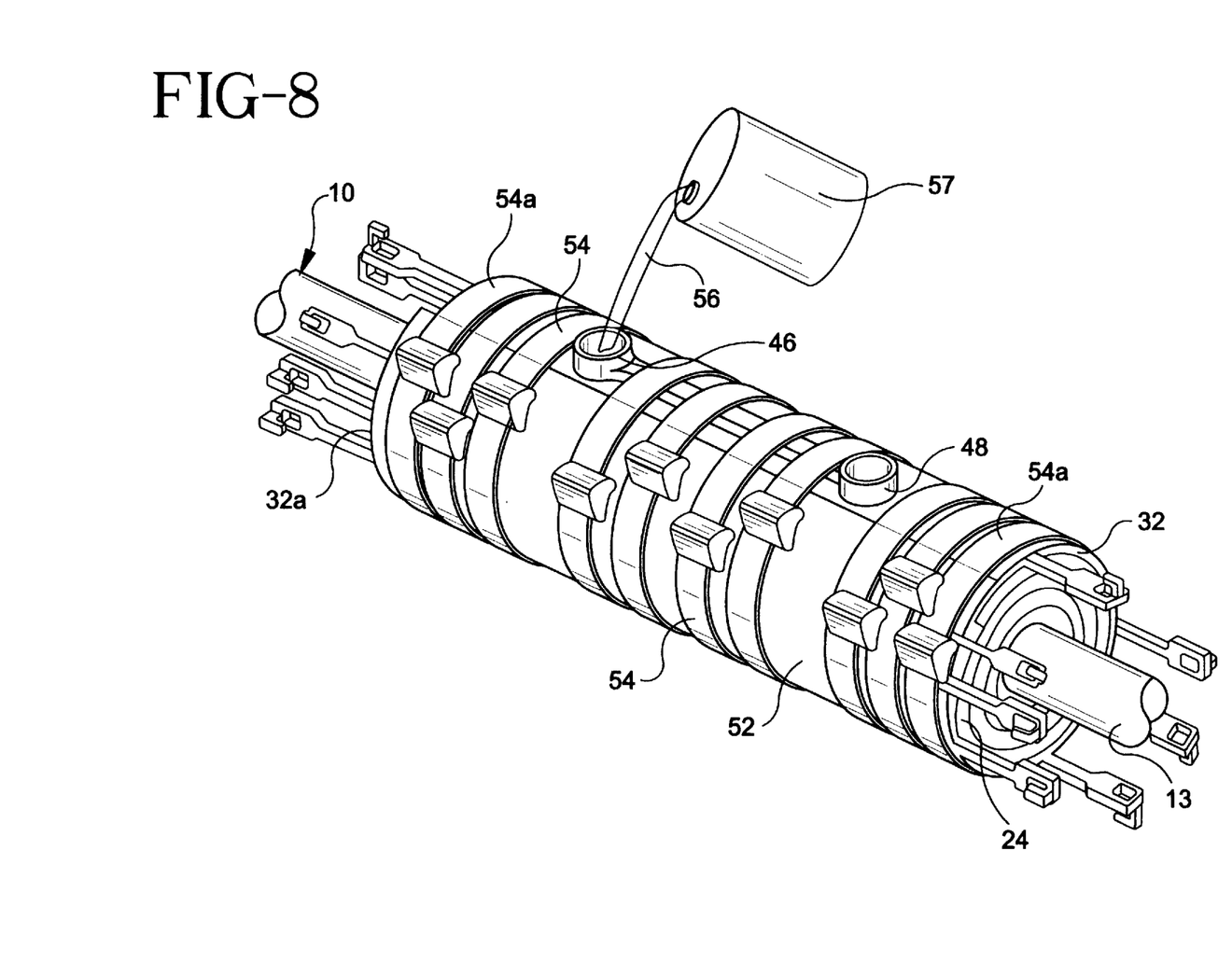
FIG. 8 shows the splice enclosure shell of FIG. 6 positioned about the cable splice with encapsulant being poured thereinto.

Having constructed enclosure 52 about splice 14, effective sealing of the splice 14 may be achieved by introducing an encapsulant 56 into enclosure 52. In order to effectively seal splice 14 and to ensure that the encapsulant seals between the intersticial spaces of the individual insulated conductors 12, the encapsulant 56 may be injected into enclosure 52 under pressure. A method and apparatus for encapsulating a cable splice under pressure is shown and described in above-mentioned U.S. Pat. No. 5,245,133 issued Sep. 14, 1993, entitled "Moisture Resistant Cable Splice and Sealing Structure Thereof" and U.S. Pat. No. 5,251,373 issued Oct. 12, 1993, entitled "Method for Protection of Cable Splice". These patents are incorporated herein by reference.

In the preferred embodiment shown herein, encapsulant 56 is poured into enclosure 52 from a suitable container 57 through inlet port 46. The encapsulant may be applied under pressure or may be subsequently pressurized. Spacer web 20 (FIG. 3) permits encapsulant to flow completely around splice 14. Outlet port 48 serves to permit the escape of air to allow enclosure 52 to be filled with encapsulant 56. Outlet port may also serve to permit escape of some encapsulant providing indication that the enclosure is filled. Alternatively, a pressure relief valve (not shown) may be interposed in outlet port 48 in a manner taught in the above-referenced '133 and '373 patents. As the encapsulant 56 is forced into enclosure 52 under pressure, there is a tendency for the encapsulant to exert outward pressure on sealing dams 24 closing open ends 32a of shell 30. Such outward pressure may be sufficient to cause migration of the sealing dams 24 out from the open ends 32a of shell 30. In order to prevent such outward migration, sealing dams 24 are retained by extending fingers 40.

Figure 9:
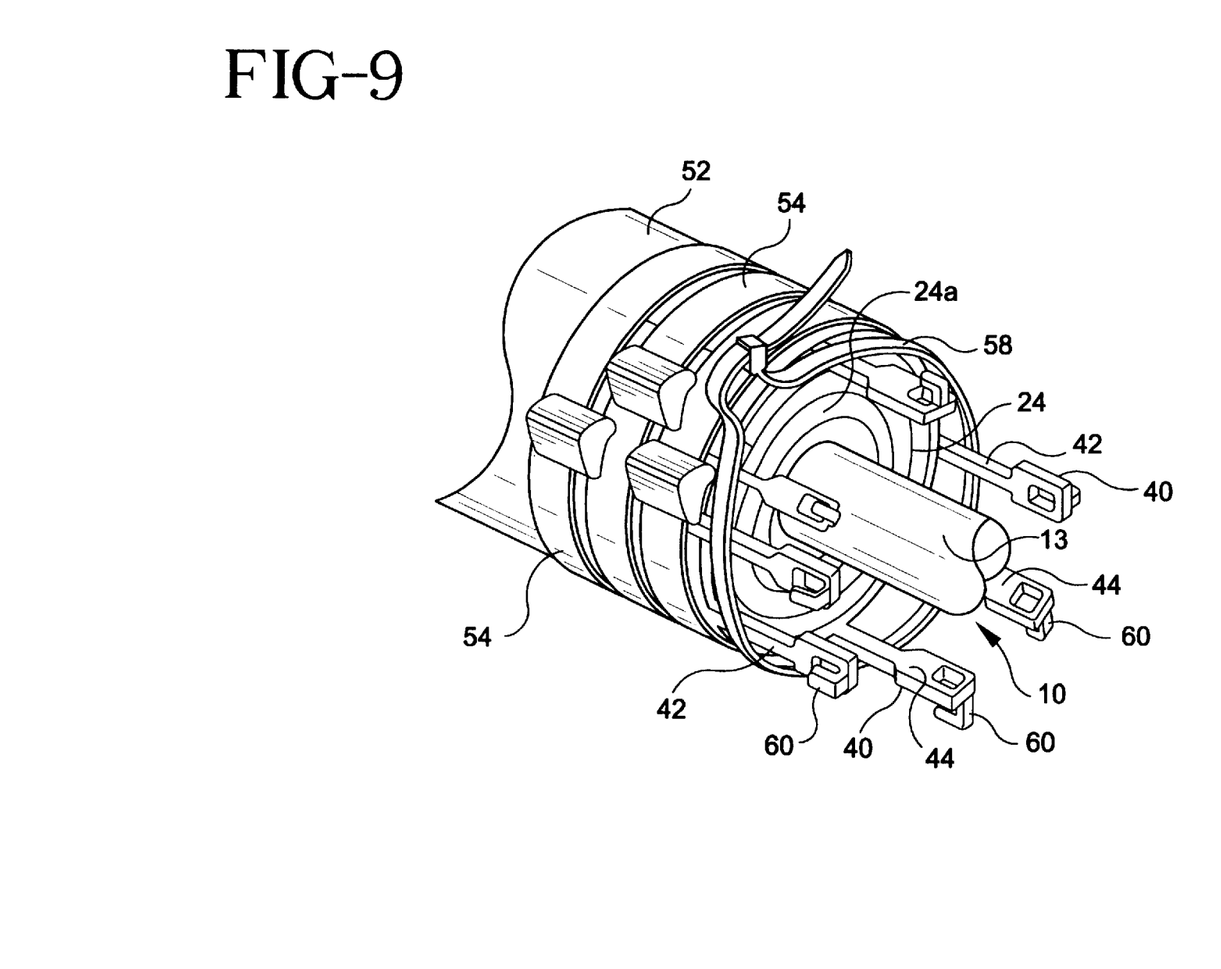
FIG. 9 shows a portion of the splice enclosure of FIG. 8, with extending shell fingers being securable to the cable.

Referring to FIG. 9, a cable tie 58 or other radially-compressive fastening member is looped around cable jacket 13 and extending fingers 40 which extend circumferentially about jacket 13. The cable tie 58 is tightened so that the tie comes in contact with distal portions 44 of fingers 40. Each of distal portions 44 includes an outwardly extending retaining element 60, which is preferably in the shape of a reverse hook. While hook-shaped retaining elements 60 are shown as the preferred technique for supporting and retaining cable tie 58, other techniques may also be employed. Retaining elements 60 serve to support cable tie 58. The cable tie 58 may be threaded or snapped into the hook-shaped retaining elements 60.

Figure 10:
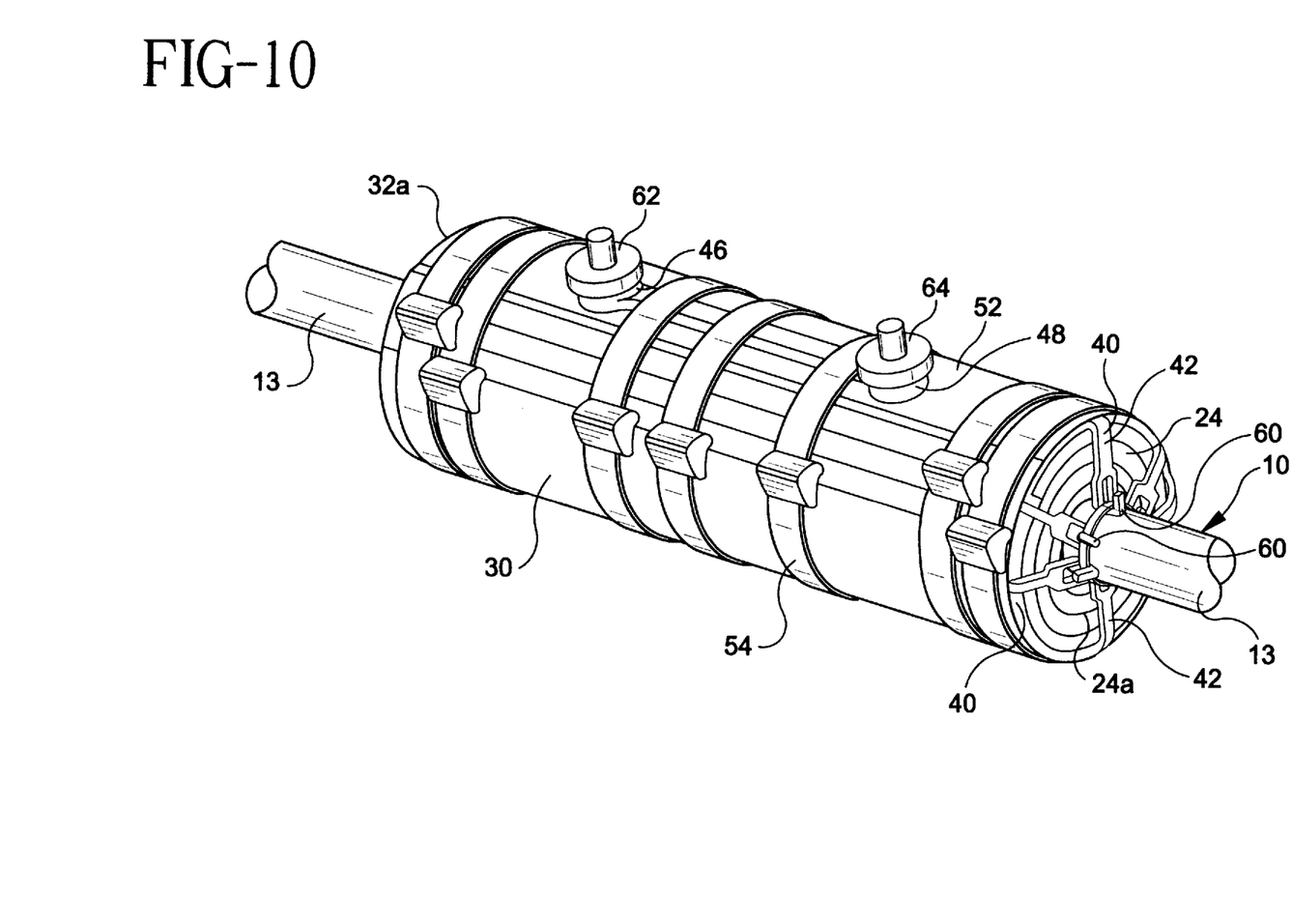
FIG. 10 shows the completed splice enclosure of the present invention secured to the electrical cable.

As seen in FIG. 10, the cable tie 58 is then tightened, preferably by hand, about cable jacket 13. In this manner, the proximal portions 42 of fingers 40 are positioned along an exterior annular surface 24a of sealing dams 24. The cable tie 58 being retained by retaining elements 60, secures the fingers 40 to cable jacket 13 outwardly adjacent sealing dam 24 preventing movement thereof. Such engagement prevents outward migration of sealing dam 24 upon the forced encapsulation of splice 14.

As described in the above referenced incorporated patents, the encapsulant 56 cures to a gel-like consistency, establishing a moisture barrier in a relatively short period of time (about one hour). Therefore, it is only necessary for the fingers 40 to positionally confine sealing dams 24 until such time as the encapsulant cures and no further pressure is exerted upon sealing dams 24. After encapsulant 56 cures plugs or caps 62 and 64 may be interposed in ports 46 and 48 to close off the ports.

Referring additionally now to FIGS. 11–15, a further embodiment of the present invention is shown. The method and apparatus described herein may be employed to enclose an extended length of cable splice which would exceed the length which could be normally covered employing the splice enclosure described in FIGS. 1–10.

Figure 11:
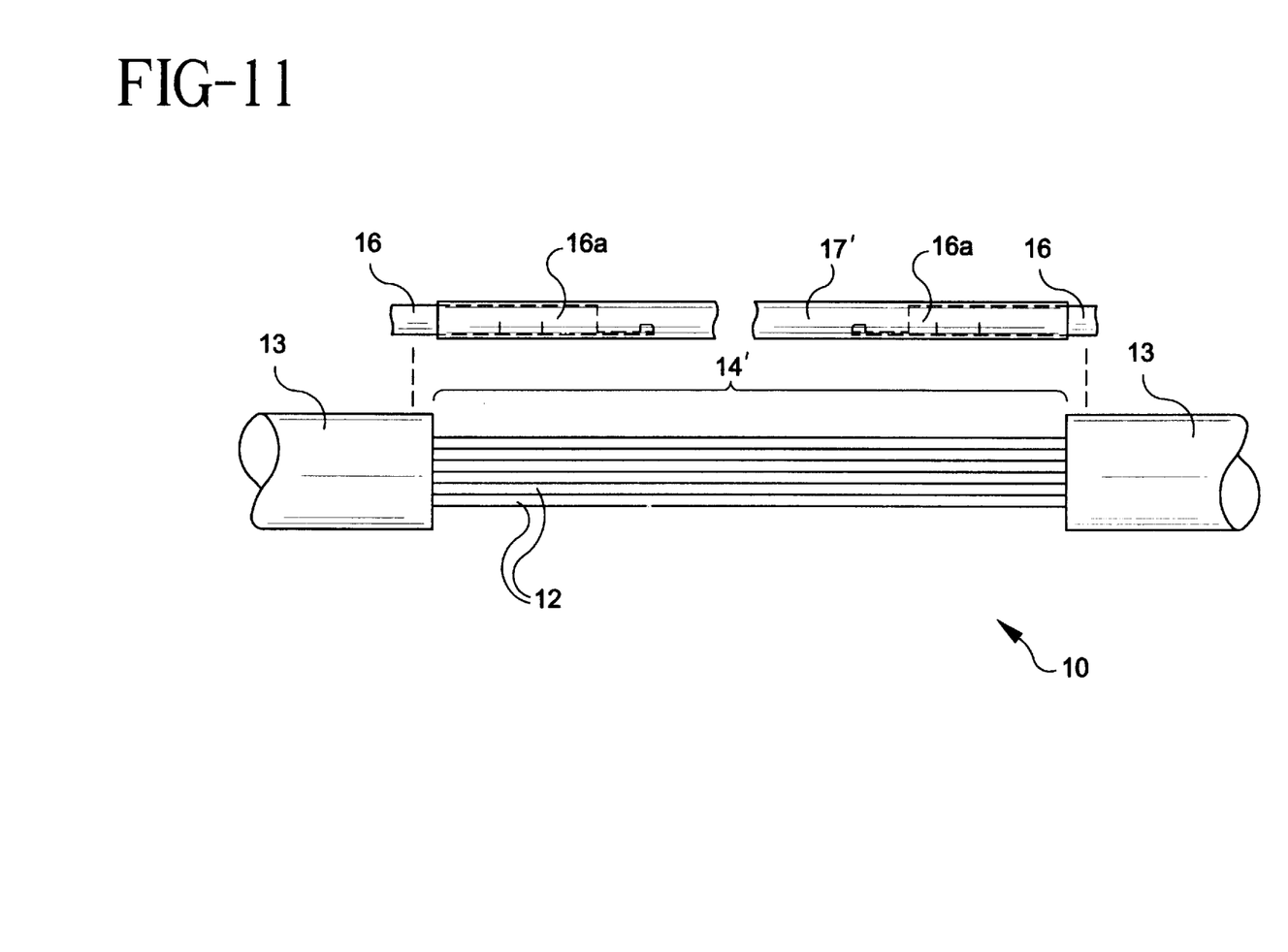
FIG. 11 is a side elevational view of an electrical cable having an exposed elongate central cable splice.

Referring specifically to FIG. 11, telecommunications cable 10 is shown having an elongate exposed area or splice 14' extending between cut away portions of cable jacket 13. Splice 14' is typically of a length which exceeds the maximum length which may be covered with the enclosure shell 30 described above (FIG. 6). In such a situation it is contemplated that splice 14' may be enclosed with two or more enclosure shells 30 in a manner described hereinbelow.

As with the embodiment described above, initially stabilizer bar 16 (FIG. 2) is used to span the splice so as to provide structural stability and to assure electrical ground continuity across the splice. As the splice 14' has an extended length, the present invention provides an extension member 17' which provides for the connection of a pair of spaced apart stabilizer bars 16 of the type described above. Extension member 17' is generally a U-shaped channel which accommodates therein ends 16a of space apart stabilizer bars 16. Each stabilizer bar 16 is secured to cable jacket 13 in a manner described above. The adjacent ends 16a of spaced apart stabilizer bars 16 are spanned by member 17'. Appropriate fastening hardware may be used to join each end 16a to member 17' to maintain structural and ground continuity between the spaced apart stabilizer bars 16. Further, the position of stabilizer bars 16 within member 17' may be linearly adjusted so as to accommodate splices 14' of various lengths. As mentioned above the stabilizer bars including member 17' may be secured to cable 10 across splice 14' prior to effecting the splicing of the conductors 12 assuring ground continuity so as to provide electrical surge protection to the installer making the splices. After the stabilizer bars 16 and member 17' have been installed, the splice 14' may be surrounded with a mesh 20 of the type shown above in FIG. 3 prior to the formation of the enclosure. However, for simplicity of description, the stabilizer bars 16, member 17' and web 20 are not shown in the remaining figures.

Figure 12:
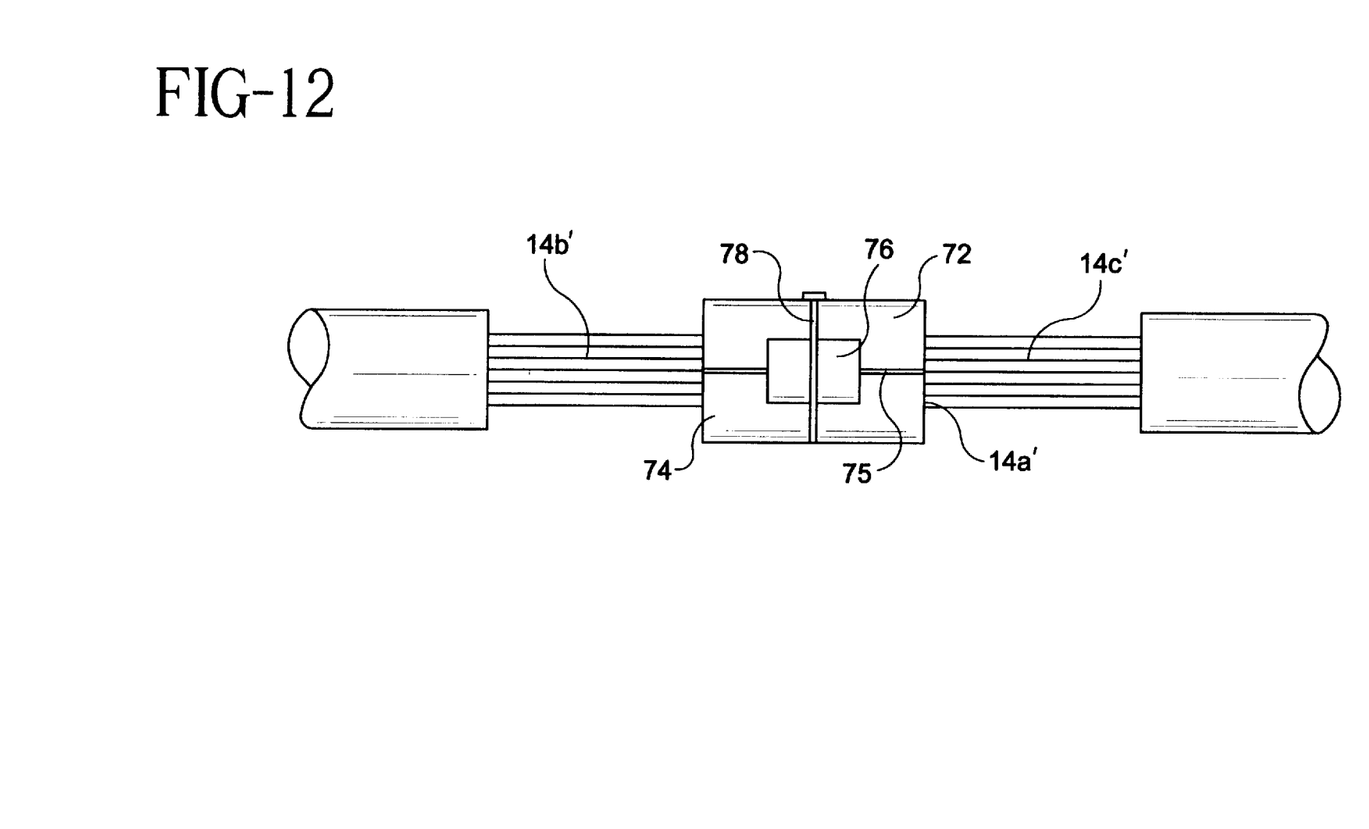
FIGS. 12 and 13 show successive steps of sealably enclosing the splice of the electrical cable of FIG. 11.
Figure 14:
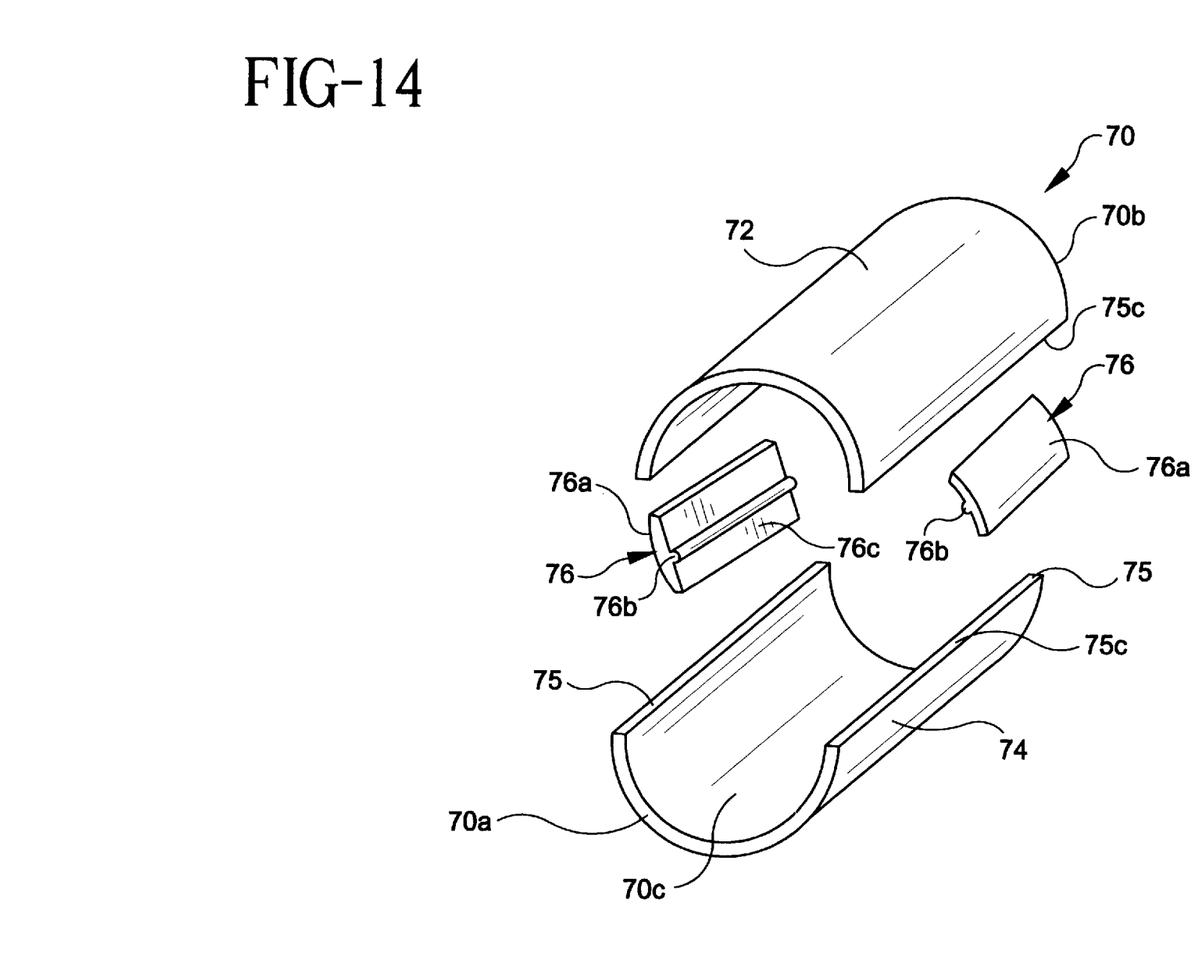
FIG. 14 is a perspective view of a cylindrical tube of the type shown in FIGS. 12 and 13 used to enclose a central portion of the cable splice.

Referring now to FIGS. 12 and 14, a central extent 14a' of splice 14' is enclosed with a two-part cylindrical tube 70. Tube 70 includes a pair of opposed open ends 70a and 70b defining a central passage 70c therebetween. Tube 70 may be a rigid plastic member preferably formed of polyvinylchloride (PVC) comprising upper and lower semi-cylindrical members 72 and 74. Members 72 and 74 may be positioned about central extent 14a' of splice 14' so as to enclose central extent 14a'. As shown in FIG. 12, the joining of upper and lower portions 72 and 74 defines diametrically opposed seams 75. The central portions 75a of such seams are sealed by rubber gaskets 76. Each rubber gasket 76 includes a planar portion 76a having a longitudinal centrally located rib 76b along an inner surface 76c which extends into seam 75. The rib 76b forms an effective seal between the upper member 72 and lower members 74 of tube 70 along the central location 75a of seam 75. A cable tie 78 may be positioned around assembled tube 70 and gasket 76 to hold them in place around central extent 14a' of splice 14'. With tube 70 in place as shown in FIG. 12 a pair of exposed lateral splice extents 14b' and 14c' are defined on end side thereof.

Figure 13:
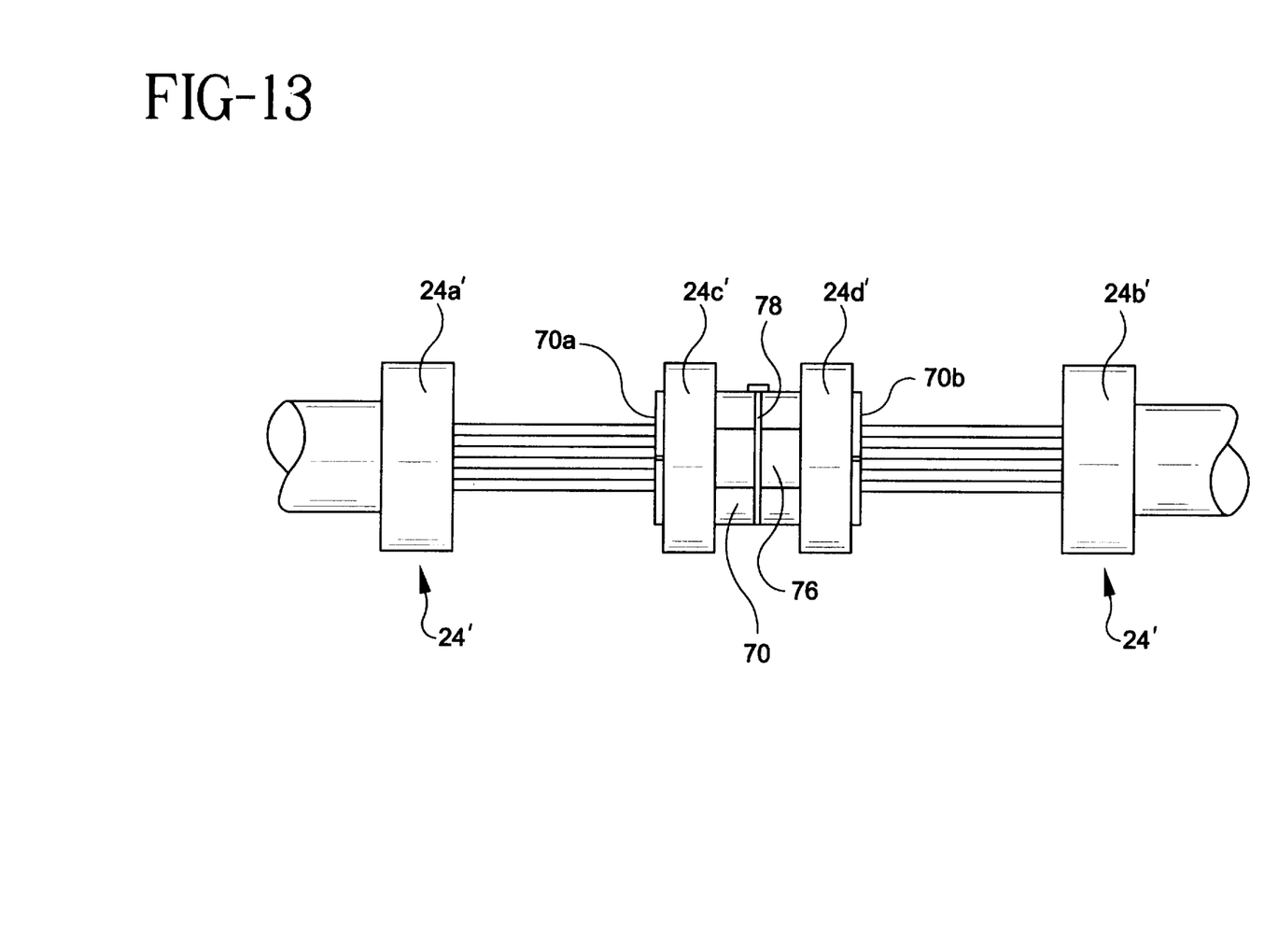

Referring now to FIG. 13, the construction of end seals or sealing dams, generally denoted as 24' is shown. Sealing dams 24' are substantially similar to sealing dams 24, shown and described above with respect to FIGS. 4 and 5. Each sealing dam 24' may be formed of a combination of closed cell foam 26 and mastic tape 28 or as described above, sealing dam 24' may be formed of either foam 26 or mastic tape 28 alone. A first pair of sealing dams 24a', 24b' are formed over cable jacket 13 adjacent splice 14' and a second pair of spaced apart sealing dams 24c', 24d' are formed over tube 70. Sealing dams 24c' and 24d' are formed to have an overall diameter which closely approximates the diameter of sealing dams 24a' and 24b', so as to permit the accommodation of shell 30 thereover. Lateral splice extent 14b' is defined between sealing dams 24a' and 24c' while lateral splice extent 14c' is defined between sealing dams 24b' and 24d'.

Figure 15:
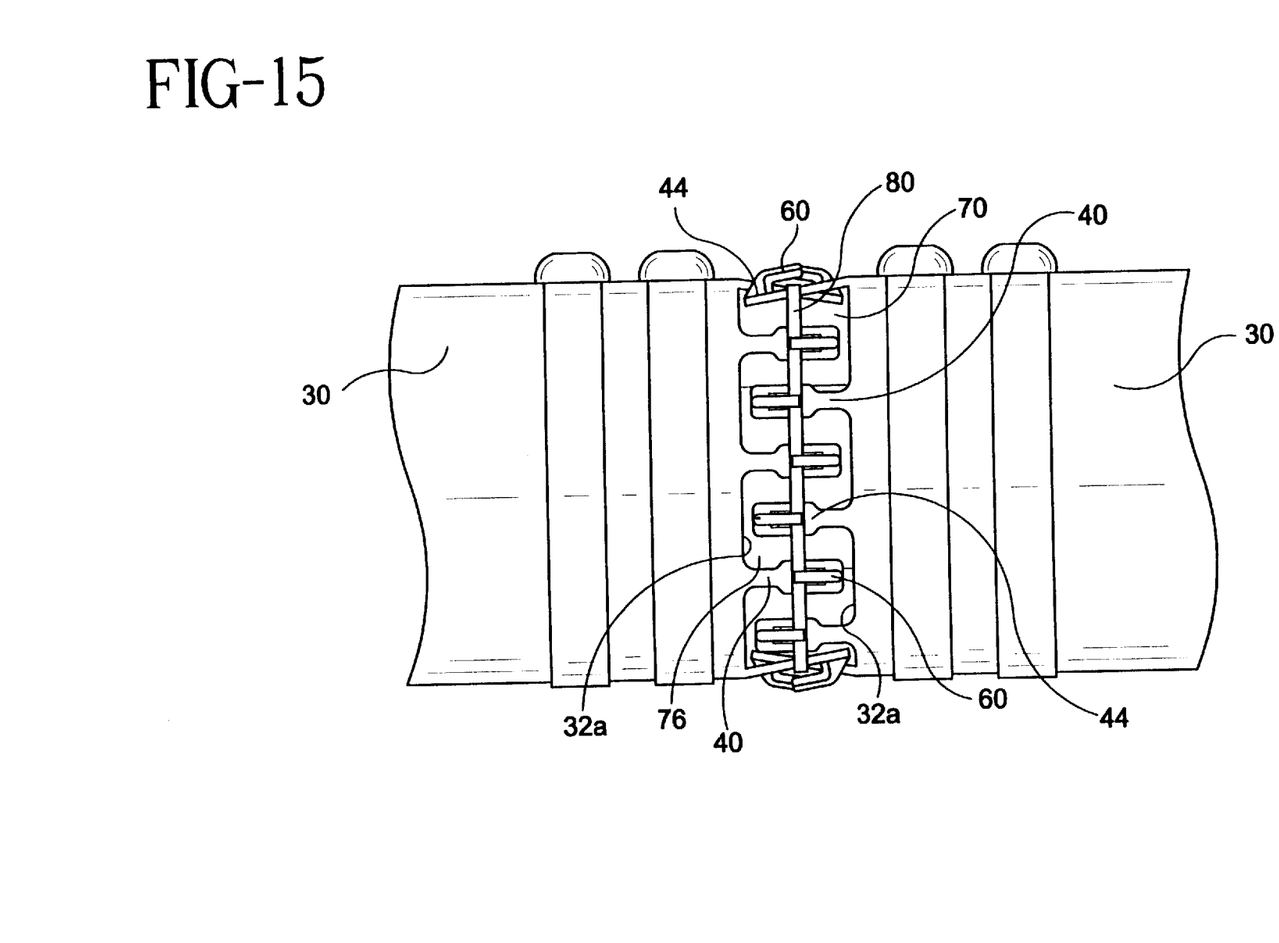
FIG. 15 is a partial plan view of an assembled cable splice enclosure formed in accordance with the present invention.

Each lateral cable splice extent 14b', 14c' may be individually covered with an enclosure shell 30 (FIG. 6) in a manner substantially described above. One shell 30 is wrapped in a cylindrical manner about end lateral splice extents 14b', 14c'. The opposed open ends of shell 30 overlap sealing dams 24' so as to individually span lateral splice extent 14b' and 14c'. The shells may be secured by use of retaining straps 54 therearound (FIG. 15). The ends of shells 30 adjacent cable jacket 13 may be secured outwardly of sealing dams 24a', 24b' in a manner described above with respect to FIG. 9. The ends of enclosure shells 30 overlying sealing dams 24c' and 24d' secured in a manner described hereinbelow with respect to FIG. 15.

The open ends 32a of spaced apart shells 30 are positioned so that the extending fingers 40 of each shell 30 interleave with the hook-shaped retaining elements 60 being in general alignment. A cable tie 80 may be interposed about the interleaved fingers 40 so that the hook-shaped retaining elements 60 accommodate cable tie 80. Cable tie 80 may now be tightened, urging the distal portions 44 of fingers 40 into contact with tube 70 thus securely positioning the fingers 40 thereagainst. Such positioning serves to prevent outward migration of dams 24c', 24d'. Also, such securement serves to interconnect the shells 30 preventing longitudinal movement therebetween.

In a manner generally described above, the enclosed splice 14' may be encapsulated with a curable encapsulant 56. Tube 70 having opposed open ends 70a and 70b has central passage 70c in communication with the interior of each enclosing shell 30. The enclosed splice 14' may be encapsulated with encapsulant 56 by injecting the encapsulant into the inlet port 46 (FIG. 8) of one of the two shells 30. The inlet port (not shown) of the other shell is appropriately closed. The outlet port 48 of both shells 30 may be used for the escape of air or alternately may include a pressure relief valve therein. Encapsulant 56 forced under pressure into one shell 30, will pass through tube 70 into the other shell to entirely fill the interior of both shells and the tube. Air will escape through the outlet ports (or pressure relief valves) allowing the entire splice 14' to be encapsulated. Rubber gaskets 76 form a seal between the upper and lower portions 72 and 74 of tube 70 preventing escape of encapsulant between the ends of shells 30.

Various changes to the foregoing described and shown structures would now be evident to those skilled in the art. Accordingly, the particularly disclosed scope of the invention is set forth in the following claims.

What is claimed is:

1. A method of sealing an elongate splice of an electrical cable comprising the steps of:

enclosing a central extent of said splice in a generally cylindrical enclosure tube so as to define exposed lateral splice extents on each side of said tube;

constructing sealing dams about said cable adjacent each end of said cable splice and adjacent each end of said tube so as to position said lateral splice extents between a pair of sealing dams;

covering said exposed lateral splice extents with a pair of elongate generally cylindrical splice enclosing shells each shell having opposed open ends, said splice enclosing shells and said tube being in communication; and sealably attaching said open ends of each said shell to said sealing dams to sealably enclose said splice.

2. A method of claim 1 further including the step of:

filling said shells and said tube with a curable encapsulant.

3. A method of claim 1 wherein said filling step includes introducing said curable encapsulant into one of said shells.

4. A method of claim 3 wherein said shells include plural elongate fingers extending from each of said ends and wherein said sealably attaching step further includes:

securing said fingers of each end outwardly adjacent each of said sealing dams.

5. A method of claim 4 wherein said securing step further includes:

providing plural compressive fastening members; and applying said compressive fastening members about said fingers to secure said fingers outwardly adjacent said sealing dams.

6. A method of claim 5 wherein said compressive fastening members are loop-type cable ties and said fingers include cable tie receiving members at the distal ends thereof; and wherein said applying step includes securing said cable ties receiving members of said fingers with said cable ties.

7. A method of claim 6 further including the step of:

aligning the cable tie receiving members of the fingers of one end of one said shell with the cable tie receiving members of the fingers of one end of the other said shell over said tube; and securing said aligned cable tie receiving members with a single cable tie.

8. A method of claim 7 further including the step of:

securing said aligned cable tie receiving members with said single cable tie against said tube.

9. A method of claim 1 wherein said enclosing step includes:

providing a pair of matable semi-cylindrical tube portions; and assembling said semi-cylindrical tube portions together about said central extend of said splice.

10. A method of claim 9 wherein said assembly step further includes:

sealably mating said semi-cylindrical tube potions about said central extent of said splice.

11. A method of claim 10 wherein said sealably mating step further includes:

interposing a sealing gasket between said mating semi-cylindrical tube portions.

* * * * *